Figure 1:
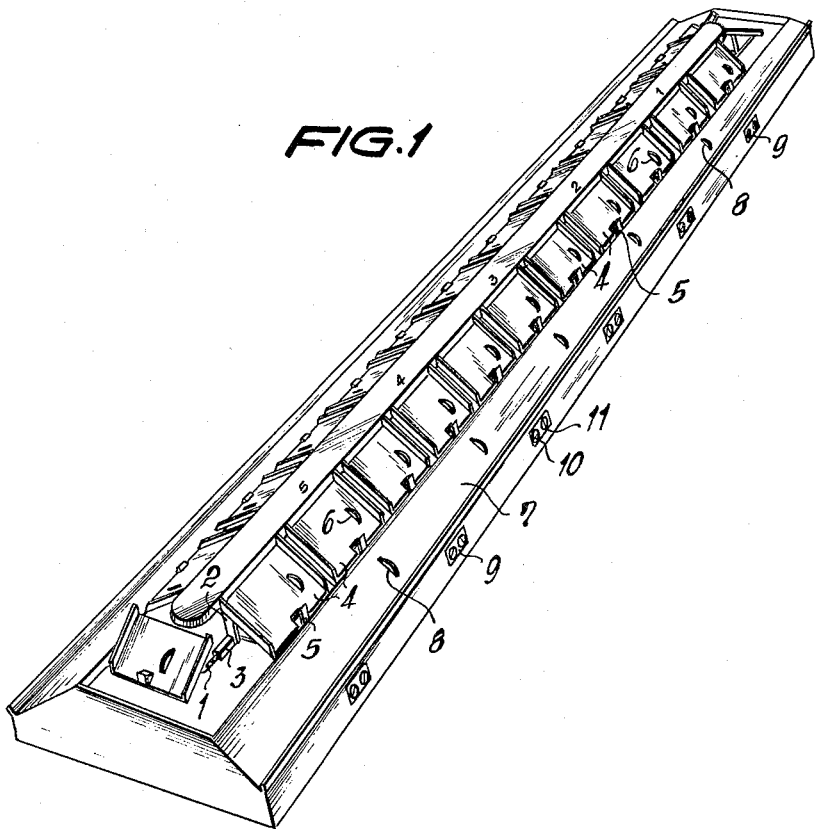

INVENTOR
Wilfried STROTHMANN

United States Patent Office 3,053,377
Patented Sept. 11, 1962

3,053,377
METHOD AND DEVICE FOR AN AUTOMATIC CONVEYING ARRANGEMENT
Wilfried Strothmann, Post Steinhagen, Westphalia, Germany, assignor to Kochs Adlernahmaschinenwerke A.G., Bielefeld, Germany
Filed Oct. 11, 1960, Ser. No. 61,875
5 Claims. (Cl. 198—38)

This invention relates to a method and a device for an automatic conveying arrangement for the conveying of articles from any desired charging position to any desired discharging position, with arrangements at every charging position or on specific charging positions, or centrally, for the preselection of a destination marking.

Conveying means is known wherein the material to be transported is conveyed from any desired working site to any other desired working site, selector arrangements being provided on special loose containers for the material to be conveyed, or on every container carrier travelling on a conveyor belt, on which arrangements the destination marking of the discharge site to which the material is to be conveyed can be set. These conveying arrangements possess disadvantages however, which do not permit complete exploitation. In the case of installations with special loose containers, on which the destination marking is set, one is confined to these containers; the use of any desired transport cases or cardboard boxes, or the transportation of solid parts without containers, is here precluded.

In the case of conveying arrangements of different principle the selector arrangement is arranged on the container carriers circulating in the installation, that is to say each container carrier must be provided with a selector arrangement. Thus in fact it becomes possible to transport any desired transport cases or also correspondingly large, solid parts without containers, but the disadvantage must be accepted of selecting on container carriers which are moving past. Thus naturally the conveying speed is limited in order to ensure adequate time for selection. Furthermore the working personnel must wait at the working sites until a free container carrier runs past, before selecting. Thus undesired losses of time occur, quite apart from the fact that the conveying time also increases.

Solutions are also known, which render possible the stationary setting of the destination marking through electro-mechanical or electro-magnetic means, and in theory could remove the described drawbacks. In fact however the practical execution is rendered doubtful, because the electrical controls require a production expense which is no longer tolerable for the user firms, and would render the economical advantages illusory.

It is the object of the invention to avoid the disadvantages which have arisen hitherto. For this purpose the invention provides a method according to which the destination marking in each case is selected by the effecting of the setting of one or more funnel mouths or guide straight-edge ends of funnels or guide straight-edges arranged stationarily on the conveying arrangement, in that laterally movable control pins arranged on the material-conveying carriers are caused to run into the funnels or against the straight-edges and on further passage are shifted by the funnels or the straight-edges into positions corresponding to the funnel mouths or straight-edge ends, while other material-conveying containers do not take over the destination markings set by the funnels or guide straight-edges, because dogs, levers or cams pivoted in by the inherent weight of the conveyed material will pivot away the control funnels or guide straight-edges and/or the control pins during the passage, and thus preclude the engagement of the control pins in funnels or straight-edges, while at the discharge position the control pins strike upon one or more notched control plates, and press these aside, but in the case of conformity of the position of the control pins with that of control plate notches or tongues instigate the discharge operation, in that in the case of plate notches the discharge cam remains standing, while in the case of the use of tongues it is pivoted in for discharge.

Figure 2:
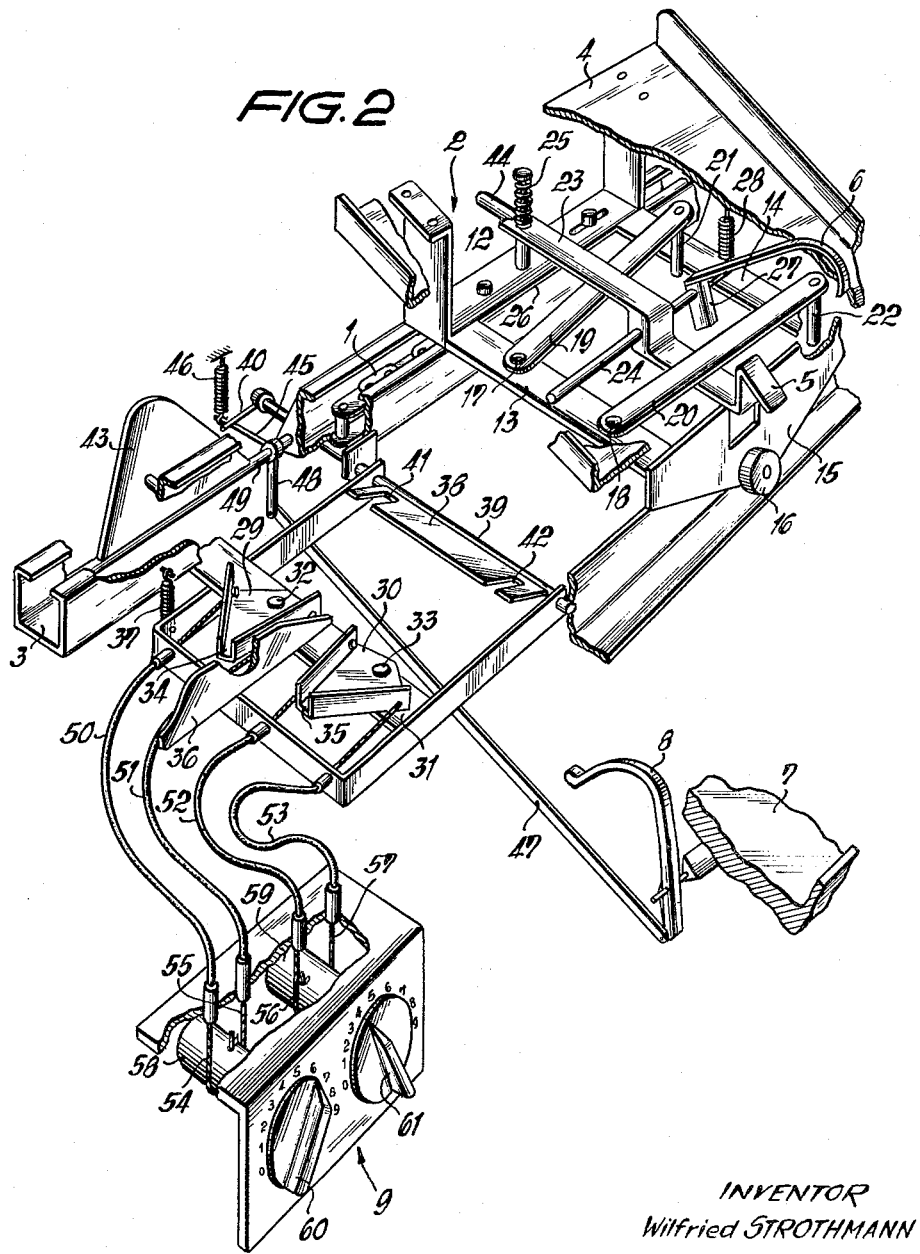
Figure 3:
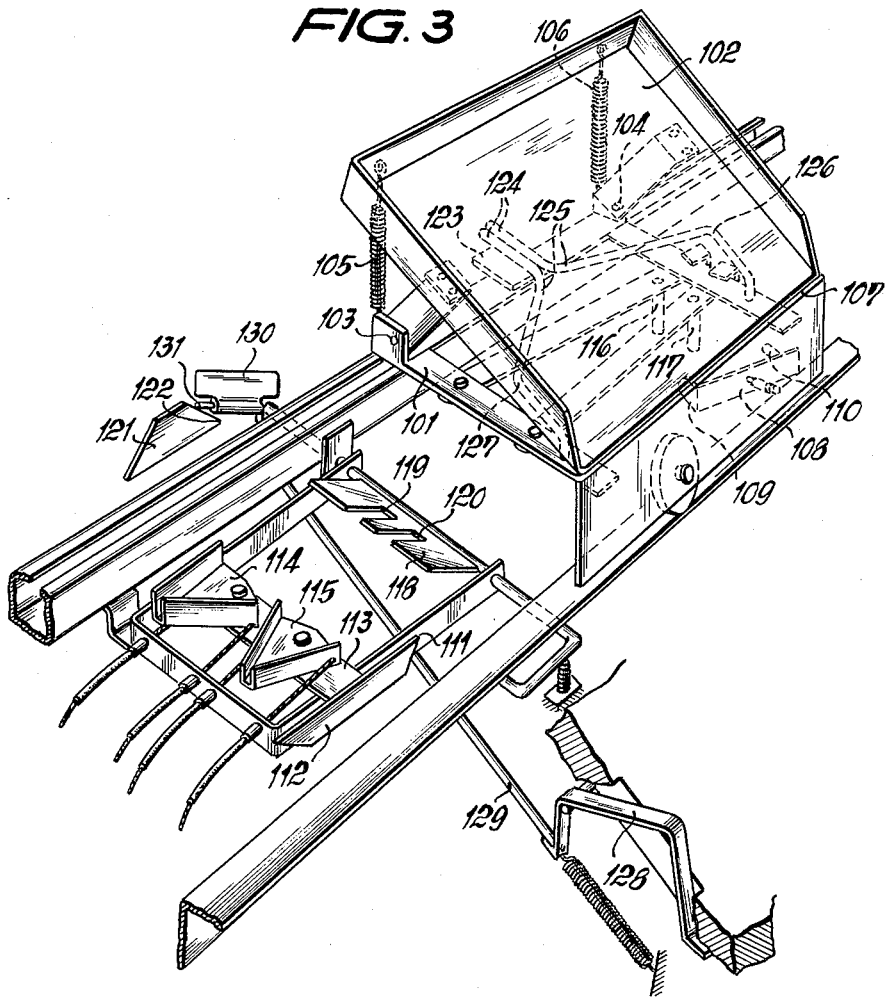

Some preferred embodiments of a device for carrying out the method will now be described by way of example and with reference to the accompanying drawings, in which FIG. 1 is a perspective view of an automatic conveying arrangement according to the invention;

FIG. 2 is a fragmentary perspective view partly in section of a discharge arrangement, and FIG. 3 is a fragmentary perspective view of another form of the invention, wherein different means is used primarily for the discharge instigation and for the switching off of the destination marking.

According to FIG. 1, on an endless chain 1 container carriers 2 are indicated, which are made similar to one another. The container carriers 2 are supported and guided on a slide rail 3. Carrier plates 4 secured on the container carriers 2 are arranged obliquely with a view to a simple discharge of the conveyed material. The conveyed material pushed on to the carrier plates 4 is secured against sliding off during conveying, by a stop 5. An operating stirrup 6 for example, which precludes the adoption of different destination markings until the predetermined destination is reached, is actuated by the weight of the pushed-on conveyed material. At every discharge position or at every destination there is situated in a discharge table 7 a blocking lever 8, which is released by the weight of the ejected conveyed material. The released blocking lever 8 blocks the discharge of all further conveyed material intended for the destination in question, until the discharge space has become free and the blocking lever 8 has returned.

In the example shown in FIG. 1 the setting of the destination marking is stationary and is arranged as a destination setting 9 on every charging position. The destination setting 9 is built up in accordance with the selection of the destination marking system. In the example according to FIG. 1 for example a decimal system with two denominations is presumed for the destination marking. The tens are set with a selector disc 10 and the units with a selector disc 11. The transmission of the set destination marking is so arranged that this marking is adopted by the passing container carriers 2 shortly before they have reached the charging site. The discharge at the predetermined destination is effected by the destination marking received by the container carrier 2, due to the fact that the stop 5 is drawn in automatically, so that the conveyed material can slide off the carrier plate 4 on to the discharge table 7.

As shown in FIG. 2, the container carrier 2 consists for example of a slide rail 12, tranverse struts 13 and 14 and a longitudinal wall 15, on which there may be arranged for example a support roller 16. On the transverse strut 13 pivot levers 19 and 20 are articulated by means of bolts 17 and 18, respectively, so that for pivoting they must overcome a specific friction resistance. The friction resistance can for example be achieved due to the fact that the pivot levers 19 and 20 rest with a specific spring force on the transverse strut 14.

The pivot levers 19 and 20 carry on their free ends control pins 21 and 22, which express the destination marking in each case by their lateral positions. The stop 5 is arranged in the middle of the container carrier 2 and is carried by the discharge lever 23 which is rotatably mounted on a spindle 24. The discharge lever 23 is pressed by a compression spring 25 supported on the slide rail 12, against a limitation 26, so that the stop 5 projects through the carrier plate 4, in order to hold the conveyed material in the conveying position. The operating stirrup 6 is also mounted on the spindle 24 and has an operating dog 27 firmly connected therewith. This dog 27 extends into the space beneath the container carrier 2. The operating stirrup 6 projects out beyond the carrier plate 4 in the unloaded state, under the influence of a tension spring 28. The transmission of the destination marking is effected for example by control funnels 29 and 30 which are mounted on a pivot frame 31 in rotatable fashion by means of bolts 32 and 33. The control funnels 29 and 30 have funnel mouths 34 and 35, the positions of which indicate the set destination marking. Due to the passage of the container carrier 2 the control pins 21 and 22 run into the pertinent control funnels 29 and 30, respectively, and are shifted laterally into positions corresponding to those of the funnel mouths 34 and 35, respectively, whereby the destination marking set with the control funnels 29 and 30 is transmitted to the container carrier 2.

Then a container carrier 2 is loaded the transmission of the destination marking is excluded. This is effected due to the fact that the operating stirrup 6 is depressed by the weight of the conveyed material. Thus the operating dog 27 is moved into a position in which it runs up on a cam member 36. Thus the pivot frame 31 is depressed so far against the action of a tension spring 37 that the control pins 21 and 22 run freely away over the control funnels 29 and 30, without engaging with them. The positions of the control pins 21 and 22 of the charged container carrier 2, corresponding to the destination marking, are thus maintained, so that the conveyed material must arrive at the predetermined destination.

On every discharge position there is arranged a control plate 38. This plate is secured on a journalled shaft 39 which carries on its outer end a reversing lever 40. In the control plate 38 there are spaced edge notches 41 and 42, the positions of which correspond to the destination marking of the relevant discharge position.

When an arriving container carrier 2 has the same destination marking as the control plate 38, the control pins 21 and 22 run freely through the edge notches 41 and 42 without coming into contact with the control plate 38. The plate 38 thus remains in the rest position, as consequently does a discharge cam plate 43. The rest position of the cam plate 43 is so dimensioned that a discharge pin 44 secured on the discharge lever 23 rides thereover. Thus the discharge lever 23 is lifted against the action of the compression spring 25 whereby the stop 5 is drawn away from the conveyed material so that the latter can slide off on to the discharge table 7.

If the position of the control pins 21 and 22 does not conform with the position of one or both plate notches 41 and 42, the destination marking of the container carrier 2 is thus different from that of the plate 38 (or of the discharge position), thus one or both of the pins 21 or 22 run up on to the plate 38, so that the latter is pivoted downwardly. Thus through the reversing lever 40 a lever 45 is also pivoted downwardly, against the action of a tension spring 46, whereby the cam plate 43 is swung outwardly so far that the discharge pin 44 does not engage the cam plate. The stop 5 remains standing in its abutment position and holds the conveyed material fast on the carrier plate 4, without change. If the destination markings of the container carrier 2 and discharge position (or plate 38) do not agree, the conveyed material is not discharged, but runs through to the predetermined destination.

If a discharge site is already occupied by discharge conveyed material, the discharge must be blocked for all further conveyed material directed to the occupied discharge site, for safety reasons. The conveyed material discharged on to the discharge table 7, by its weight, depresses the blocking lever 8 so that through a draw rod 47, a lever arm 48 and a spindle 49, the cam plate 43 is pivoted away against the action of the tension spring 46 and comes out of engagement for the discharge pin 44 until the discharge table 7 at the appropriate position becomes free and the blocking lever 8 returns. Since when the discharge table 7 is occupied at the discharge site the relevant cam plate 43 is pivoted out so that no conveyed material can be discharged from the carrier plate 4.

The setting of the control funnels 29 and 30 in such fashion that the funnel mouths 34 and 35 are brought into the positions corresponding to the preselected destination markings, is effected for example by means of "Bowden" cables 50, 51, 52 and 53 having wire cores 54, 55, 56 and 57 which are secured at one of their ends on the control funnels 29 and 30, while their other ends are received by setting cylinders 58 and 59 connected to selector discs 60 and 61. By rotation of the setting cylinders 58 and 59 the setting funnels 29 and 30 are pivoted into the desired positions.

The remote setting of the control funnels 29 and 30 by the "Bowden" cables 50, 51, 52 and 53 or through other mechanical or electro-magnetic means permits of arranging the selector discs 60 and 61 at any desired place in relation to the charging site. Inter alia this also provides the possibility of combining the selector discs 60 and 61 of all charging sites centrally, for specific cases.

According to FIG. 3, on a sliding frame 101 a carrier plate 102 is pivotably mounted on bearings 103 and 104, that it is held through tension springs 105 and 106, when in the uncharged state, in a position in which the surface of the carrier plate 102 is flush with the upper edge of an end plate 107. An index lever 108 abuts with a nose 109 from beneath against the carrier plate 102 so that in the unloaded state an index pin 110 stands, as a result of its own weight, in its lowermost position which is defined by a stop. In this position, the index pin 110, in its passage, comes under a tip 111 of a lifting cam member 112. The lifting cam member 112 is secured on a pivot frame 113 which carries control funnels 114 and 115 in the same manner as described with reference to the embodiment shown in FIG. 2. Since when the carrier plate 102 is unloaded the index pin 110 engages beneath the tip 111, on further passage the lifting cam member 112 and thus the pivot frame 113 are so far lifted that control pins 116 and 117 engage with the control funnels 114 and 115 and take over the set destination marking by a lateral movement corresponding to the positions of the control funnels.

When the carrier plate 102 is loaded, the taking over of the destination marking set on the control funnels 114 and 115 must be excluded. This is effected due to the fact that the charged carrier plate 102, under the weight of the conveyed material, hinges downwardly, the end plate 107 then projecting above the surface of the carrier plate 102 and effecting the securing of the conveyed material against sliding off. On swinging down of the carrier plate 102 the nose 109 of the index lever 108 is also depressed, whereby the index pin 110 moves upwardly into such a position that it must run over the tip 111 or over the lifting cam member 112. The pivot frame 113 then cannot be lifted, the control pins 116 and 117 move freely away over the control funnels 114 and 115 without being able to engage therein. The transmission of the destination marking to the sliding frame 101 is thus excluded when the carrier plate 102 is loaded. The originally assumed destination marking intended for the conveyed material in each case remains unchanged until the destination is reached.

At the discharge site of the destination there is situated, similarly to the case of the embodiment shown in FIG. 2, a control plate 118, which possesses spaced notches 119 and 120 arranged to correspond to the destination marking of the relevant discharge position. If the destination marking of the sliding frame 101 conforms with that of the control plate 118, the control pins 116 and 117 again run freely through the plate notches 119 and 120, without contacting or moving the plate 118. A discharge cam plate 121 thus remains in its position which is so selected that a curve tip 122 runs in between a catch plate 123 and a slide arm 124. The cam plate 121 then supports itself on the catch plate 123, while the slide arm 124 is lifted by the discharge cam plate 121. The slide arm 124 is connected with a discharge fork 125 which is pivotably mounted in the sliding frame 101 and supports the loaded carrier plate 102 on support positions 126 and 127. If now the discharge fork 125 is lifted by means of the slide arm 124, the carrier plate 102 is pressed upwardly at the same time through the support positions 126 and 127 until the upper edge of the end plate 107 is reached. The conveyed material can then slide off on to the discharge table.

If the destination markings of the control pins 116 and 117 do not agree with that of the control notched plate 118, the latter is pressed downwardly by one or both control pins 116 and 117. Thus the discharge cam plate 121 pivots so far downwardly that the cam plate tip 122 runs under the catch plate 123, whereby the cam plate 121 is pressed still further downwardly and cannot come into contact with the slide arm 124. Since the slide arm 124 and the discharge fork 125 remain at rest, no discharge takes place.

When a discharge site is occupied and the discharge must be blocked, the blocking lever is depressed by the weight of the discharged material. Through a push rod 129 a blocking plate 130 which is mounted on a support arm 131 for the cam plate 121, is hinged on to the curve tip 122. Thus in every case the catch plate 123 is guided over the discharge cam plate 121 so that the latter is completely pressed downwardly. The discharge operation then cannot take place.

The preferred embodiments shown and described by way of example are based upon a so-called negative control system for the instigation of the discharge, that is to say the discharge is instigated when the control pins 21 and 22 or 116 and 117 do not actuate the notched plate 38 or 118, respectively. A positive control system is also readily possible, that is to say the "plate" 38 or 118 is actuated in order to instigate the discharge. In such a case with each control pin there is associated a separate plate which receives in place of the notches 41, 42 or 119, 120 a tongue, while the remaining plate surface is omitted. All "plates" then pivot the discharge cam member 43 or 121 in for ejection, through a differential linkage, only the sum of the deflections of all plates (two in each case for the examples of embodiment) being able to pivot in the discharge cam plate 43 or 121 so far that the discharge function is instigated. The deflection of one plate for example is not sufficient.

I claim:

1. A conveying system comprising an endless member, means mounting said endless member for movement about a predetermined path, a plurality of carriers secured to said endless member for movement about said path therewith, a stop member associated with each of said carriers for holding articles thereon, means interconnecting each carrier and the associated stop member for relative movement to render said stop members ineffective, a movably mounted discharge cam at least at one point along said path for selectively effecting said relative movement to release articles carried by said carriers, discharge cam control means carried by each carrier for controlling the position of said discharge cam as the particular carrier passes said discharge cam to selectively release articles carried by said carriers, and means for setting said discharge cam control means positioned at least at one point along the path of said carriers for setting said discharge cam control means as said carriers move past said means for setting said discharge cam control means, each of said carriers having a member for riding up on said discharge cam, means mounting said discharge cam for pivotal movement between a position aligned with the path of said members and a misaligned position, a control plate connected to said discharge cam and having spaced notches for controlling the position thereof, and said discharge cam control means including at least one movable finger carried by each carrier for selective engagement with said notched control plate.

2. The conveying system of claim 1 wherein means is provided for engagement by a newly discharged article to pivot said discharge cam to said misaligned position to prevent the further discharging of articles until the newly discharged article has been removed.

3. The conveying system of claim 1 wherein said means for setting said discharge cam control means including a finger positioning guide, and means for selectively positioning said guide to set the position of said movable finger for selective cooperation with said control comb.

4. The conveying system of claim 3 together with means carried by each of said carriers for rendering said means for setting said discharge cam control means inoperative when an article is being carried by the particular carrier.

5. The conveying system of claim 3 wherein a second cam is associated with said guide, and a control member for each carrier movable by an article of the carrier for positioning said control member for riding over said second cam to prevent engagement of said finger with said guide when an article is positioned on the respective carrier.

References Cited in the file of this patent

UNITED STATES PATENTS 3,014,573    Baumann et al.    Dec. 26, 1961

FOREIGN PATENTS 836,158    Great Britain    June 1, 1960
841,400    Great Britain    July 13, 1960